COULT & DAVIS.
Churn.
No. 6,457.
Patented May 15, 1849.
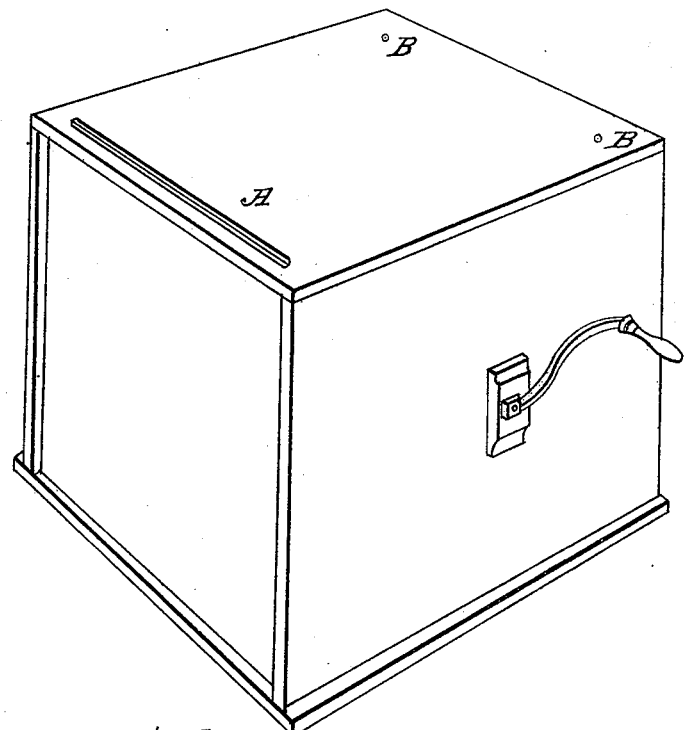
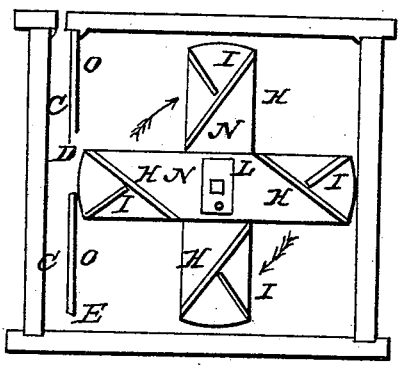
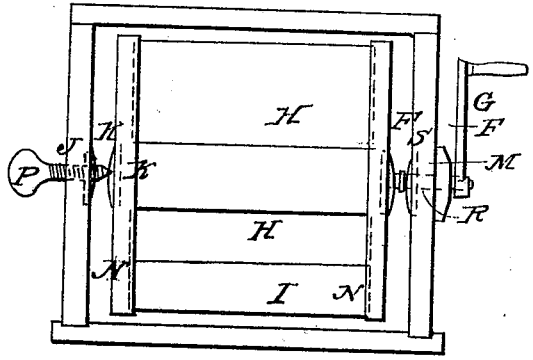
Witnesses
John H Coult
Ths A Coult
Inventors
Joseph C Coult
A. B. Davis

UNITED STATES PATENT OFFICE.

JOSEPH C. COULT AND A. B. DAVIS, OF PHILADELPHIA, PENNSYLVANIA.

ATMOSPHERIC CHURN.

Specification of Letters Patent No. 6,457, dated May 15, 1849; Antedated March 19, 1849.

*To all whom it may concern:*

Be it known that we, JOSEPH C. COULT and AUGUSTUS B. DAVIS, both of the district of Spring Garden, county of Philadelphia, and State of Pennsylvania, have invented a new and Improved Mode of Constructing Churns, and declare the following to be a full and exact description.

In the accompanying drawings, Figure 1 represents a perspective view of the churn ready for use. Fig. 2, a sectional end view and Fig. 3, a sectionl side view.

The sides, ends and bottom are made of boards about one inch thick and grooved together to prevent leakage. The top is fitted on by means of cleats, so that it can be removed at pleasure. Letter A represents a slot through the top, to let the air pass into the chamber C, which air-chamber is formed by the partition O, grooved in the ends of the churn that it may be removed for the purpose of cleaning the churn.

B B represent holes through the top for the purpose of letting the air escape.

D represents a slot in the partition O.

E is a passage under the partition O.

F is packing box to the shaft M.

S is a collar on the shaft M resting against the plate R.

G is the crank. Now it is evident that in turning the crank in the direction of the arrows, a portion of the milk or cream will be carried up and pass into the air-chambers through the slot D and into the body of the churn through the space E.

The milk being carried through the chambers as above described will cause a current of air to rush in at the slot A Fig. 1 and out at B, B thus keeping a constant supply of fresh air in the churn. The paddles H are grooved in the cross bars N, and each diagonally across as represented in Fig. 2. The paddles I pass from the corners of the cross bars to within about a quarter of an inch of the paddles H. The paddles H being placed diagonally across the bars N by turning slowly it will collect the butter in the center between the buckets H.

Having thus fully described the construction of our Union churn, what we claim as our invention and desire to secure by Letters Patent is—

The air chamber C formed by the partition O, with the slot D and passage E. We do not rest our claim upon the particular form of the air-chamber, as the same thing may be accomplished by tubes running from the top around the paddles with an opening in the sides of the tubes toward the lower ends and next the paddles. We therefore claim the invention of a churn having a passage formed substantially as above described and which operates so that the motion of the milk or cream will create a constant supply of fresh air passing in through said passage into the milk and out at another passage, substantially in the manner and for the purpose set forth.

JOSEPH C. COULT.
A. B. DAVIS.

Witnesses:
JOHN H. COULT,
S. A. COULT.